(12) United States Patent
Fried

(10) Patent No.: US 8,495,521 B2
(45) Date of Patent: Jul. 23, 2013

(54) RELATIONSHIP MAP GENERATOR

(75) Inventor: Eric Philip Fried, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/569,098

(22) Filed: Sep. 29, 2009

(65) Prior Publication Data

US 2011/0078635 A1 Mar. 31, 2011

(51) Int. Cl.
*G06F 3/048* (2006.01)
*G06F 17/00* (2006.01)
*G06F 7/00* (2006.01)

(52) U.S. Cl.
USPC .......... 715/853; 715/267; 715/854; 707/603; 707/748; 707/796

(58) Field of Classification Search
USPC .................. 715/853, 854, 267; 707/603, 796, 707/748
See application file for complete search history.

(56) References Cited

U.S. PATENT DOCUMENTS

| 5,312,478 | A | | 5/1994 | Reed | |
|---|---|---|---|---|---|
| 5,546,507 | A | * | 8/1996 | Staub | 706/60 |
| 5,875,445 | A | * | 2/1999 | Antonshenkov | 1/1 |
| 5,989,034 | A | | 11/1999 | Ninomiya | |
| 6,279,007 | B1 | * | 8/2001 | Uppala | 1/1 |
| 7,259,763 | B2 | * | 8/2007 | Jager et al. | 345/440 |
| 7,447,667 | B2 | * | 11/2008 | Gong et al. | 706/47 |
| 7,743,316 | B2 | * | 6/2010 | Bauchot | 715/212 |
| 7,984,371 | B2 | * | 7/2011 | Zdenek | 715/212 |
| 8,112,384 | B2 | * | 2/2012 | Mitra et al. | 707/603 |

| 2003/0177136 | A1 | * | 9/2003 | Alpert | 707/101 |
|---|---|---|---|---|---|
| 2005/0262081 | A1 | | 11/2005 | Newman | |
| 2006/0005164 | A1 | | 1/2006 | Jetter | |
| 2006/0095474 | A1 | | 5/2006 | Mitra | |
| 2006/0133296 | A1 | * | 6/2006 | Berthaud et al. | 370/252 |
| 2007/0033519 | A1 | * | 2/2007 | Zdenek | 715/503 |
| 2007/0083554 | A1 | | 4/2007 | Crume | |
| 2007/0299708 | A1 | | 12/2007 | Ouderkirk | |
| 2008/0001948 | A1 | | 1/2008 | Hirsch | |
| 2009/0157630 | A1 | * | 6/2009 | Yuan | 707/3 |

FOREIGN PATENT DOCUMENTS

EP 1615145 A2 11/2006

OTHER PUBLICATIONS

Buzan—"Mind Maps"—Mind Maps How to Mind Map—Buzan World, pp. 1-4, downloaded from http://www.buzanworld.com/Mind_Maps.htm on Aug. 17, 2009.
Freemind—"FreeMind—free mind mapping software", pp. 1-8, downloaded from http://freemind.sourceforge.net/wiki/index.php/Main_Page on Aug. 6, 2009.

(Continued)

*Primary Examiner* — Nicholas Ulrich
(74) *Attorney, Agent, or Firm* — John D Flynn; Mark P Kahler

(57) ABSTRACT

A relationship map includes multiple nodes that display related information from node to node in a tree-like, hierarchical fashion. The relationship map associates a formula with a particular node of the relationship map. The relationship map also associates range information with the particular node, the range information indicating a range of nodes to which the formula should be applied. The range information may indicate whether the nodes in the range extend leafward or rootward from the particular node in the relationship map. The relationship map displays the particular node updated with result information that a relationship map generator generates when applying the formula to the nodes specified by the range information.

12 Claims, 7 Drawing Sheets

OTHER PUBLICATIONS

Mind42—"Mind42.com", pp. 1-3, downloaded from http://mind42.com/about on Aug. 6, 2009.

Mindjet1—"Mindjet Solutions Business Case: Achieving Success in the Information Economy", © 2008 Mindjet LLC, USA, pp. 1-13.

Mindjet2—"Mindjet® MindManager®: A Vital Solution for Improved Project Management", pp. 1-5, © 2006 Mindjet LLC, USA.

Mindjet3—"Putting the Participatory Culture to Work How a Changing Corporate Mindset and Advanced Tools are Enabling New Forms of Collaboration and Closure", pp. 1-8, © 2008.

Mindjet4—"7-Step Project Mapping with MindManager", pp. 1-24, White Pater Jul. 2003.

Morris—"Helium—Software reviews: Mindjet Mind Manager", p. 1, © 2002-2009 Helium, Inc.

Techbyte—"Review: Mindjet Mind Manager 8", By Techbyte, Published: Feb. 25, 2009, pp. 1-3.

Tutorial—"Spreadsheet Tutorial" pp. 1-25, downloaded from http://www.k12.hi.us/-tethree/01-2/tutorials/ss/home3.html on Aug. 6, 2009.

* cited by examiner

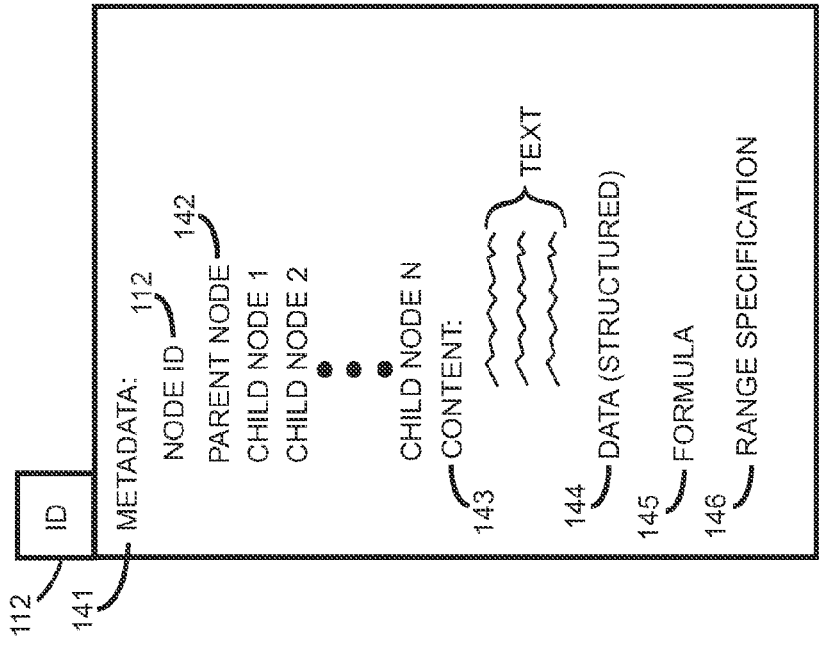
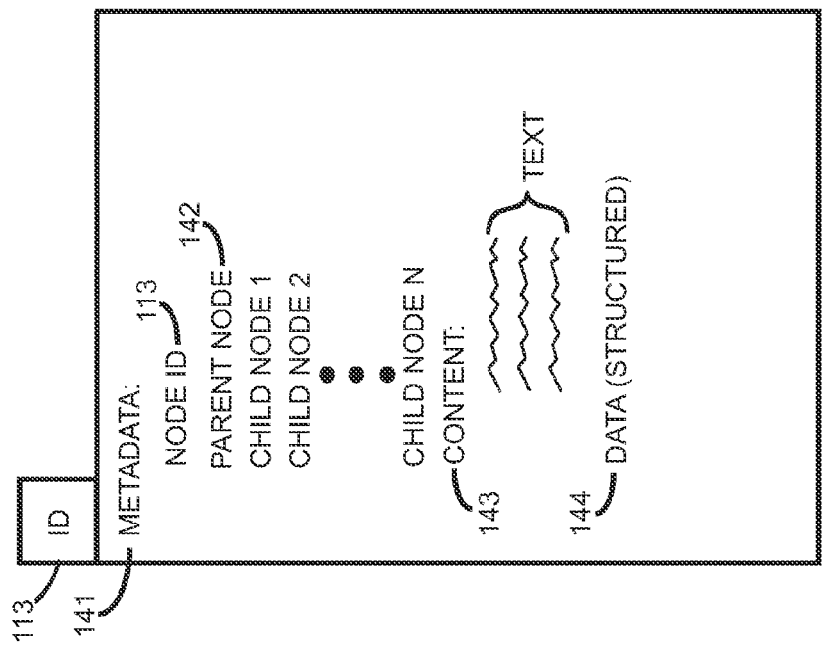

FORMULA:
VALUE OF CALCULATED NODE = SUM OF CALCULATED NODES IDENTIFIED BY THE RANGE SPECIFICATION

RANGE SPECIFICATION:

RELATIONSHIP MAP GENERATOR

BACKGROUND

Relationship mapping is an image-based process for generating and relating concepts to one another in a graphical fashion. Relationship mapping may also be referred to as mind mapping or concept mapping. A relationship map may include a central main topic node from which sub-topic nodes of the relationship map link or extend. The central node represents a main topic. The sub-topic nodes represent sub-topics that relate to the main topic of the central node. These sub-topic nodes may connect to other sub-topic nodes that store other sub-topic information in hierarchical, tree-like fashion. The main topic in the central node leads to a sub-topic in a sub-topic node, which in turn may lead to another sub-topic in another sub-topic node. The central node together with the hierarchical sub-topic nodes form a relationship map that allows a user to view a thought process in a more intuitive, logical fashion than might otherwise be possible. Relationship maps have myriad uses such as project management, meeting planning, process analysis and more.

BRIEF SUMMARY

In one embodiment, a method of generating a relationship map is disclosed. The method includes inputting, to an information handling system (IHS), relationship data including a plurality of nodes that together form the relationship map. The method also includes inputting, to the IHS, a formula to be associated with a particular node of the plurality of nodes. The method further includes inputting, to the IHS, range information for the formula associated with the particular node, the range information specifying a range of nodes to which the formula associated with the particular node should be applied. The method still further includes applying, by the IHS, the formula associated with the particular node to node data derived from the range of nodes to determine result information for the particular node. The method also includes displaying, by the IHS on a display, the relationship map including the particular node updated with the result information.

In another embodiment, an information handling system (IHS) is disclosed that includes a processor. A memory is coupled to the processor. The memory is configured with a relationship map generator that receives relationship data including a plurality of nodes that together form a relationship map. The relationship map generator receives a formula to be associated with a particular node of the plurality of nodes. The relationship map generator also receives range information for the formula associated with the particular node, the range information specifying a range of nodes to which the formula associated with the particular node should be applied. The relationship map generator further applies the formula associated with the particular node to node data derived from the range of nodes to determine result information for the particular node. The relationship map generator also activates display of the particular node of the relationship map updated with the result information.

In another embodiment, a computer program product stored on a computer operable medium is disclosed. The computer program product includes instructions that receive relationship data including a plurality of nodes that together form a relationship map. The computer program product also includes instructions that receive a formula to be associated with a particular node of the plurality of nodes. The computer program product further includes instructions that receive range information for the formula associated with the particular node, the range information specifying a range of nodes to which the formula associated with the particular node should be applied. The computer program product still further includes instructions that apply the formula associated with the particular node to node data derived from the range of nodes to determine result information for the particular node. The computer program product also includes instructions that activate display of the particular node of the relationship map updated with the result information.

BRIEF DESCRIPTION OF THE DRAWINGS

The appended drawings illustrate only exemplary embodiments of the invention and therefore do not limit its scope because the inventive concepts lend themselves to other equally effective embodiments.

FIGS. 1B and 1C show a non-calculated node and calculated node, respectively.

DETAILED DESCRIPTION

Figure 1A:
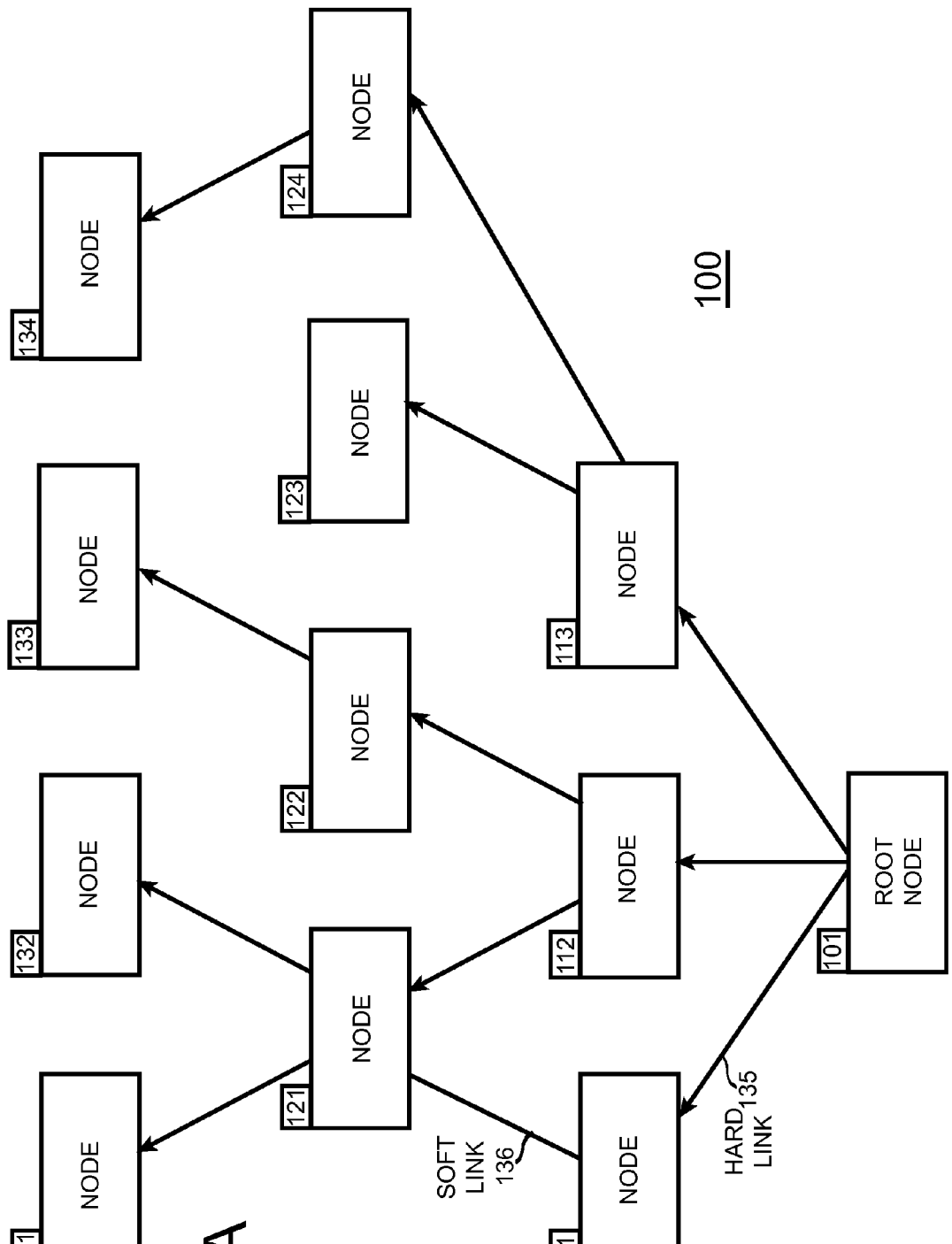
FIG. 1A shows a relationship map diagram including a plurality of nodes.

FIG. 1 shows a relationship map 100 that an information handling system (IHS) may generate when practicing the disclosed relationship map generation methodology. In one embodiment, relationship map 100 may represent words, ideas, numbers, topics, sub-topics and other information organized in a tree-like, hierarchical structure to facilitate logical thought, study or problem solving. Relationship map 100 includes a root node 101 from which other nodes extend or link. Each node in relationship map 100 includes a unique node identifier. For example, 101 is the unique identifier of root node 101. Root node 101 is the starting node or starting point of relationship map 100. Root node 101 may store text, graphics, a number, a formula and/or other data and information.

Relationship map 100 also includes child nodes 111, 112 and 113 at a depth equal to 1 node away from root node 101 as seen in FIG. 1. Root node 101 acts as the parent node of child nodes 111, 121 and 123. Relationship map 100 further includes child nodes 121, 122, 123 and 124 at a depth equal to 2 nodes away from root node 101 in this particular relationship map 100. Nodes 111, 112 and 113 act as parent nodes to child nodes 121, 122, 123 and 124. The relationship map 100 also includes child nodes 131, 132, 133 and 134 at a depth equal to 3 nodes away from root node 101. Nodes 121, 122 and 124 act as parent nodes to child nodes 131, 132, 133 and 134.

In other words, at a depth on 1 node from root node 101, child nodes 111, 112 and 113 are children of root node or parent node 101. At a depth of 2 nodes from root node 101, child nodes 121, 122, 123 and 124 are children of parent nodes 111, 112 and 113. At a depth of 3 nodes from root node 101, child nodes 131, 132, 133 and 134 are children of parent nodes 121, 122 and 124 as seen in FIG. 1A.

In one embodiment, the disclosed relationship map methodology employs a relationship map generator software application to actually generate the nodes and links of the relationship map on a display based upon user input for those nodes. The relationship map generator software application will be described below in more detail in conjunction with the information handling system of FIG. 2 and the flowcharts of FIGS. 3 and 4.

The arrow lines between nodes in relationship map 100 may be referred to as "hard links". The arrow of each hard link indicates the direction of flow from a parent node to a child node. For example, the arrow of hard link 135 indicates flow from parent or root node 101 to child node 111. A "soft link" indicates flow from one node to another without specifying a hard direction. For example, soft link 136 allows flow from node 111 to node 121 or flow from node 121 to node 111.

A "leafward" link is a link in which flow is from a parent node to a child node in a direction away from root node 101, i.e. toward the leaves of the relationship map. A "rootward" link is a link in which flow is from a parent node to a child node in a direction toward root node 101. In other words, leafward flow is in a direction away from the root node toward other nodes that may be considered to be leaf nodes. Rootward flow is in a direction toward root node 101.

In one embodiment, a particular node of relationship map 100 may include a formula that applies to a range of other nodes of map 100 to determine a resultant value for the particular node. A range specification describes the nodes to which the formula applies to determine a resultant value of the particular node, as described in more detail below. A node that includes such a formula and range specification is a "calculated node". Those nodes in map 100 without a formula and range specification are "non-calculated nodes". In the case of the calculated node, the value or information that map 100 displays for a particular calculated node depends on the formula of the calculated node as applied to those other nodes in the range specification.

FIG. 1B shows an example of a non-calculated node 113 while FIG. 1C shows an example of a calculated node 112. Non-calculated node 113 includes metadata such as a unique node identifier (also 113) and the node identifier of the parent node 142 for node 113. In this particular example, node 101 is the parent node for non-calculated node 113. Thus, node 101 is parent node 142. The metadata of non-calculated node 113 further includes a list of the child nodes 1, 2, . . . N for node 113. In this particular example, node 123 and node 124 are the child nodes of node 113. The metadata 141 of node 113 also includes content 143 such as text or graphics. Metadata 141 further includes structured data 144 such as numbers, dates and other numerical or non-numerical information.

FIG. 1C shows an example of a calculated node 112. Calculated node 112 of FIG. 1C is similar to non-calculated node 113 of FIG. 1B with like numbers indicating like elements. However, calculated node 112 also includes formula 145 and range specification 146. Formula 145 is a formula or expression for a particular calculated node, such as node 112 in FIG. 1D, that applies to those nodes in the range specification for this particular calculated node. For example, referring again to FIG. 1D, if the formula or expression 145 is "SUM" for the particular calculated node 112, and the range specification indicates a range of all nodes at a depth of 1 with respect to the particular node, then the relationship map application adds the numerical data of child node 121 (namely extracted data=6) to the numerical data of child node 122 (namely extracted data=4) within the specified range together to obtain a resultant value (namely 10) that map 100 displays for calculated node 112.

Figure 1D:
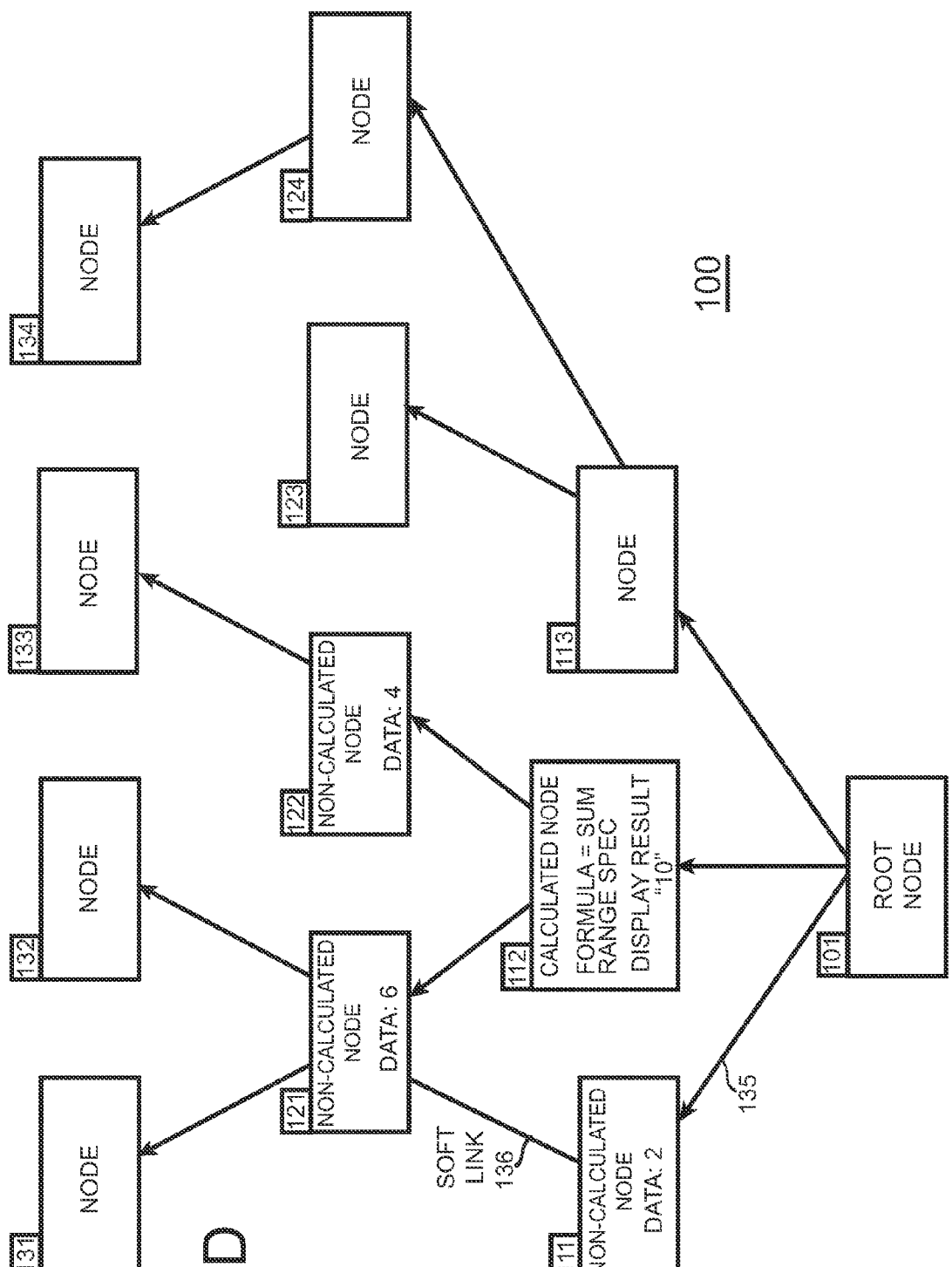
FIG. 1D shows a relationship map diagram including both calculated nodes and non-calculated nodes.
Figures 1E, 1F:
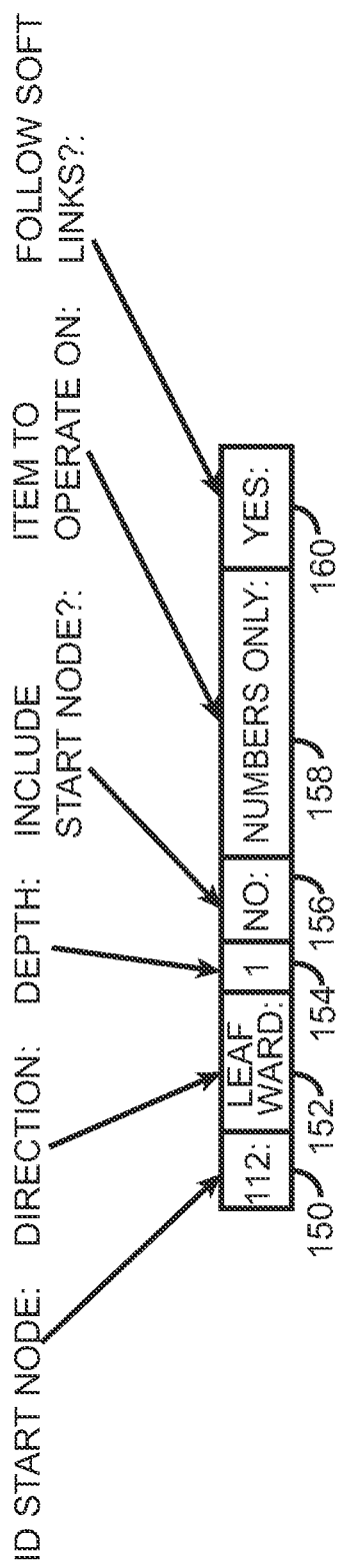
FIG. 1E shows a formula associated with a calculated node of a relationship map diagram.
FIG. 1F shows a range specification and representative range descriptors for a relationship map diagram.

FIG. 1E provides more detail with respect to the representative formula associated with a calculated node. The formula of a calculated node may be expressions such as sum, difference, average, multiply, divide or other expressions or functions that operate on the values or data of the nodes that the range specification indicates. In this particular calculated node shown in FIG. 1E, the formula or expression is "SUM" which indicates that the relationship map software application will determine the sum of all nodes indicated in the range specification and display that sum in the calculated node on the relationship map.

FIG. 1F provides more detail with respect to the range specification of a representative calculated node. The range specification may include range descriptors separated by colons or other demarcations to permit parsing among the descriptors. This example includes the following range descriptors. The ID START NODE descriptor 150 is 112 and this indicates the node at which the range of the range specification starts. The range may start at nodes other than the particular calculated node if desired. The DIRECTION descriptor 152 indicates the direction toward which the range extends from the starting node, i.e. either leafward or rootward. Leafward indicates a direction toward the leaves of the relationship map and away from root node 101. Rootward indicates a direction toward root node 101. The DEPTH descriptor 154 indicates how deep the range extends in a leafward or rootward direction. A DEPTH of 1 indicates a range spanning 1 node away from the starting node or start node. A DEPTH of 2 indicates a range spanning 2 nodes away from the start node. In this particular example the DEPTH is 1 thus indicating that the range spans those nodes 1 node away from the start node and linked thereto. The INCLUDE START NODE descriptor 156 indicates whether or not the range includes the start node. In this example, the range does not include the start node 112 because the INCLUDE START NODE descriptor 156 is set to NO. The ITEM TO OPERATE ON descriptor 158 indicates the particular elements within a node to which the formula or expression should apply. In this example, the ITEM TO OPERATE ON descriptor 158 indicates "numbers only" and thus the formula will operate on numerical data within the nodes of the specified range. The FOLLOW SOFT LINKS descriptor 160 indicates whether or not soft links should be followed to include soft link connected nodes within the range specification. In this example, soft links encountered within the depth 1 of the DEPTH descriptor 154 will be followed and included in the range to which the formula applies.

Figure 2:
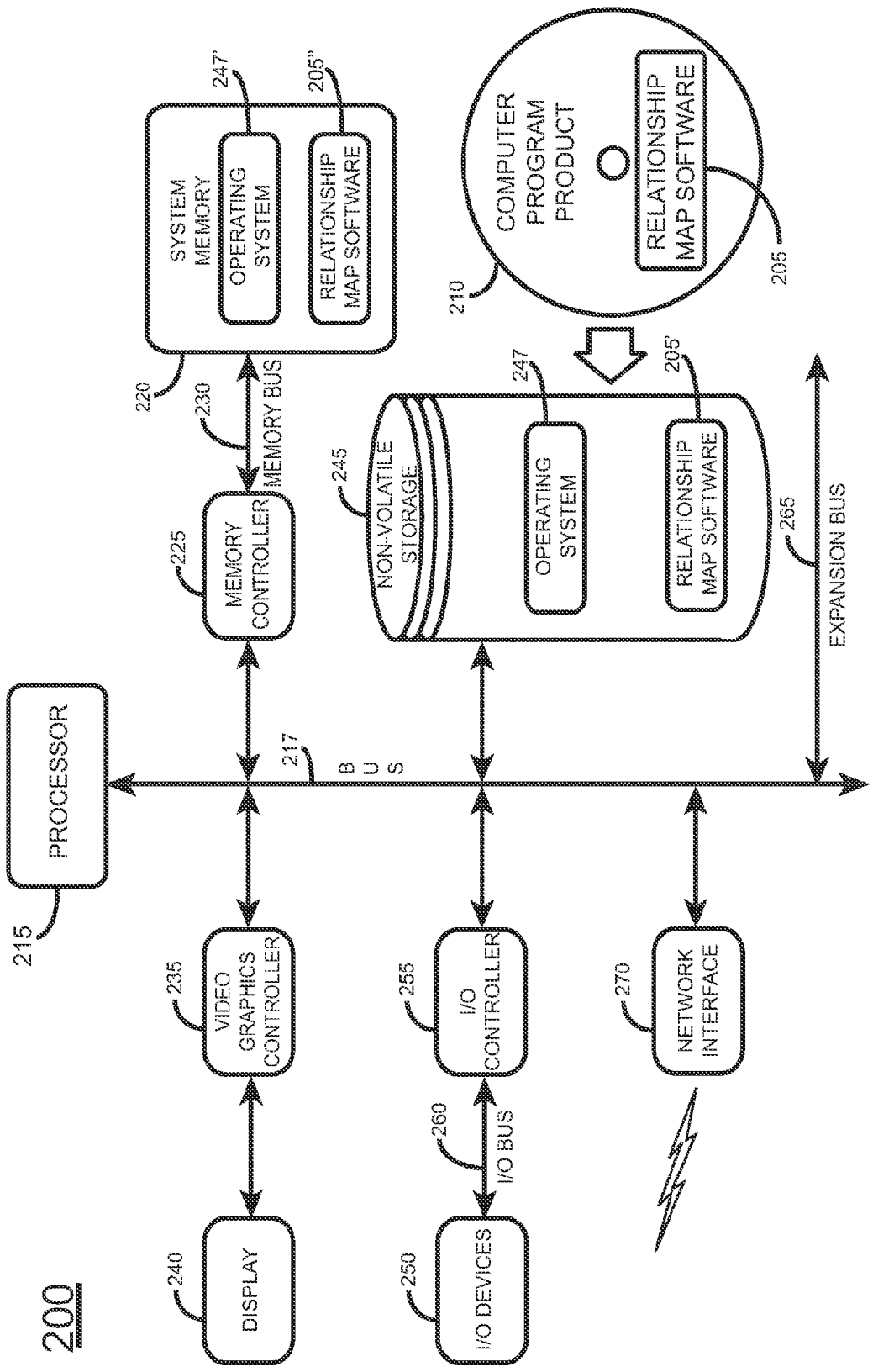
FIG. 2 is an information handling system (IHS) that employs the disclosed relationship map methodology.

FIG. 2 shows an information handling system (IHS) 200 that includes a relationship map generator software application 205. IHS 200 may initially store relationship map software application 205 as a computer program product on a medium 210, such as a CD, DVD or other medium. In this particular embodiment, IHS 200 includes a processor 215 that may include multiple cores. IHS 200 processes, transfers, communicates, modifies, stores or otherwise handles information in digital form, analog form or other form. IHS 200 includes a bus 217 that couples processor 215 to system memory 220 via a memory controller 225 and memory bus 230. In one embodiment, system memory 220 is external to processor 215. Processor 215 may also include local memory (not shown) such as L1 and L2 caches (not shown) on common semiconductor die. A video graphics controller 235 couples display 240 to bus 217. Nonvolatile storage 245, such as a hard disk drive, CD drive, DVD drive, or other nonvolatile storage, couples to bus 217 to provide IHS 200 with permanent storage of information. Operating system 247 loads in memory 220 from storage 245 to govern the operation of IHS 200. I/O devices 250, such as a keyboard and a mouse pointing device, couple to bus 217 via I/O controller 255 and I/O bus 260. One or more expansion busses 265, such as USB, IEEE 1394 bus, ATA, SATA, PCI, PCIE and other busses, couple to bus 217 to facilitate the connection of peripherals and devices to IHS 200. A network interface adapter 270 couples to bus 217 to enable IHS 200 to connect by wire or wirelessly to a network and other information handling systems. While FIG. 2 shows one IHS that employs processor 215, the IHS may take many forms. For example, IHS 200 may take the form of a desktop, server, portable, laptop, notebook, or other form factor computer or data processing system. IHS 200 may take other form factors such as a gaming device, a personal digital assistant (PDA), a portable telephone device, a communication device or other devices that include a processor and memory.

A user of IHS 200 loads medium 210 into IHS 200 to store relationship map software 205 on non-volatile storage 245 as relationship map software application 205'. When IHS 200 initializes, the IHS loads operating system 247 into system memory 220 for execution as operating system 247'. The IHS also loads relationship map software application 205' into system memory 120 for execution as relationship map software application 205".

Figure 3:
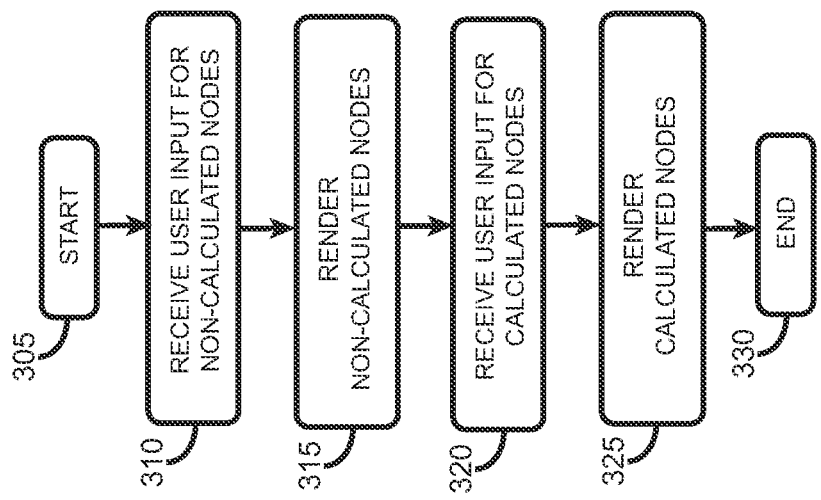
FIG. 3 is a high level flowchart of the disclosed relationship map generator methodology.

FIG. 3 is a high level flowchart that depicts process flow in the relationship map software application 205 when IHS 200 executes this application. Process flow commences at start block 305. Relationship map application 205 receives user input that describes non-calculated nodes in a particular relationship map, as per block 310. This input need not come directly from a user. Rather, IHS 200 and application 205 may receive this input from other IHS's, applications and sources. IHS 200 renders the non-calculated nodes to display the non-calculated nodes on a display in the fashion shown in FIG. 1D, as per block 315. Relationship map application 205 also receives user input that describes any calculated nodes in the particular relationship map, as per block 320. Again, this input need not come directly from a user of the application and IHS. IHS 200 renders the calculated nodes on a display together with the non-calculated nodes, as seen in FIG. 1D. While a particular node may initially be a non-calculated node, the user may edit a non-calculated node such as node 113 by 1) selecting node 113 by clicking on node 113 with a mouse; 2) inputting a formula to the selected node 113; and 3) inputting a range specification to the selected node 113. In response, application 205 executes the formula as applied to data in the nodes that the range specification indicates to provide a result that IHS 200 displays.

Figure 4:
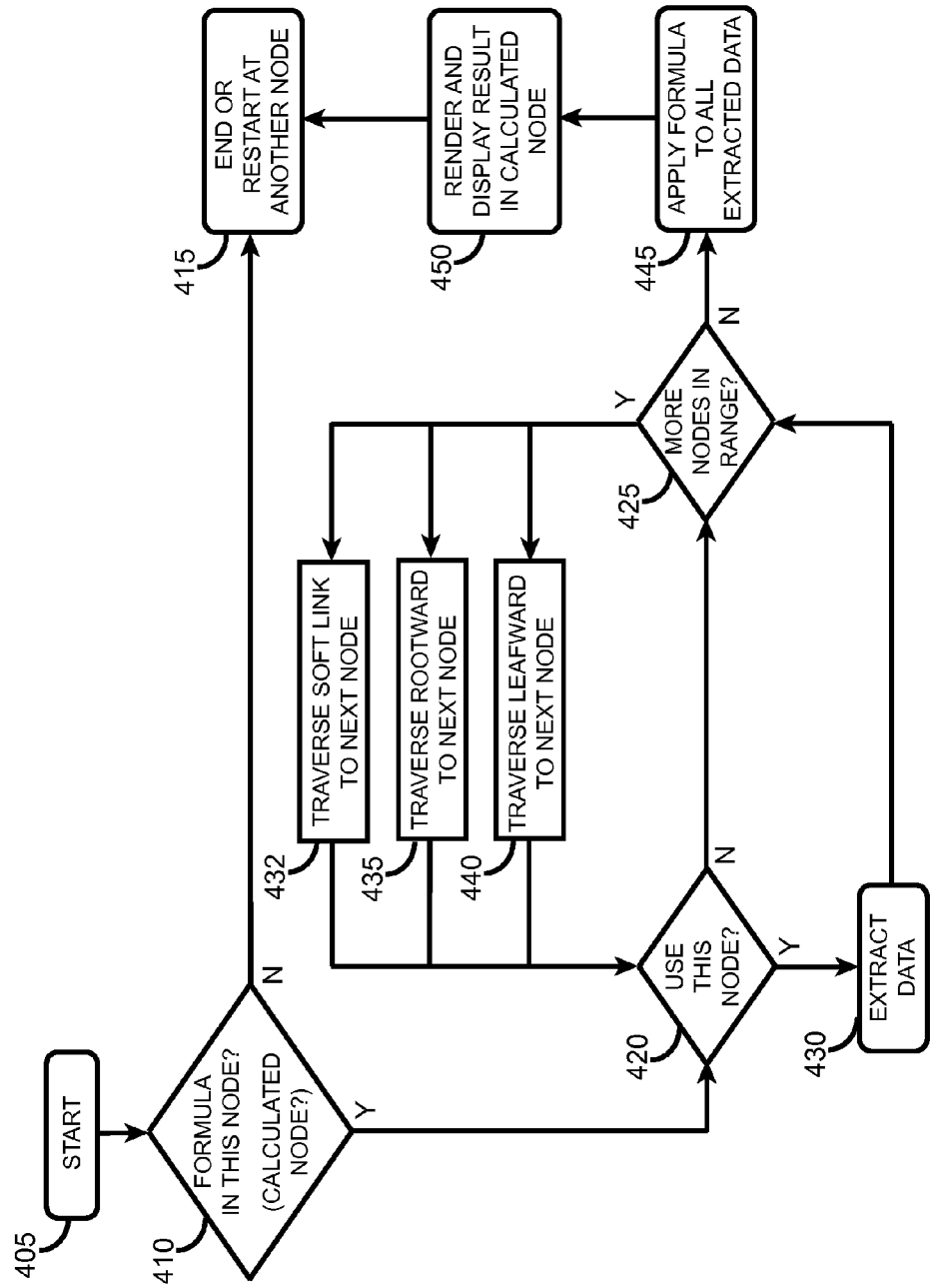
FIG. 4 a more detailed flowchart of the disclosed relationship map generator methodology.

FIG. 4 is a more detailed flowchart that depicts process flow in the relationship map generator software application 205 as IHS 200 executes this application. The relationship map software application 205 acts as a relationship map generator. Process flow commences at start block 405. In one embodiment, application software 205 starts at root node 101 and evaluates the information at that node. Application 205 moves from node to node and renders each node according to whether each node is a calculated node or a non-calculated node. For example, if application 205 determines that node 101 includes a formula and range specification, then application software 205 treats node 101 as a calculated node. More particularly, application 205 extracts data from the nodes designated by the range specification. Application 205 accumulates that extracted data as application 205 traverses the nodes that the range specification designates. Application 205 applies the formula to that extracted data. Application 205 effectively moves from node to node within the leaf structure indicated by the range specification to extract data from selected nodes indicated by the range specification. This movement from the node to node while collecting data therefrom may be referred to as traversing nodes. Application 205 may traverse nodes in a leafward direction or a rootward direction depending upon the particular direction selected by the range specification. If application 205 determines that a particular node contains no formula or range specification, then application 205 treats the particular node as a non-calculated node and renders that node.

IHS 200 may execute the software that the flowchart of FIG. 4 represents for each node of a relationship map to determine if each node is a calculated node. Applications software 205 makes this determination by testing a particular node to determine if the particular node includes a formula, as per block 410. If the particular node includes no formula, then it is a non-calculated node and process flow continues to end block 415. The process either ends at end block 415 or restarts to evaluate other nodes to determine if they are calculated nodes with formulas therein. However, If the particular node includes a formula, then the particular node is a calculated node and the process continues. In one embodiment, those nodes including a formula also contain a specific range specification that defines the nodes to which the application software will apply the formula of the particular calculated node. It is also possible that a range specification may include default values in some cases. For discussion purposes, assume that the particular node currently under evaluation by application software 205 is a calculated node that includes a formula and a range specification.

As discussed above, application software 205 determines if the particular node is a calculated node by accessing the particular node to see if the node includes a formula. In this example, the particular node includes a formula and a range specification. Thus, decision block 410 determines that the particular node is a calculated node. In response to this determination that the particular node under evaluation is a calculated node, application software 205 determines whether or not to use the particular node as data to which the formula of the particular node should apply, as per decision block 420. The particular node currently under evaluation may be a start node or another node of the range specification. At decision block 420, application software 205 first tests the particular calculated node including the formula to determine if the formula of the calculated node should apply to the data from the particular node. Decision block 420 also tests other nodes of the range specification node to see if the formula of the calculated node should apply to their data as well. In other words, decision block 420 tests to determine which nodes to include in the range to which the formula of the particular calculated node should apply.

To perform the test of decision block 420, application software 205 accesses the range specification of the particular node. Referring to FIG. 1F, application software 205 accesses the corresponding range specification for the particular calculated node to determine whether or not to include the particular node in the range to which the formula applies. Assume for discussion purposes that the node under evaluation is a start node. In this example, the INCLUDE START NODE descriptor 156 of FIG. 1F is "NO" and thus the particular node is not part of the range to which the formula of the particular node applies. Thus, decision block 420 determines to not use the start node in the range and process flow continues to a "more nodes in range" test at decision block 425. Alternatively, if decision block 420 determined that the particular node should be included in the range to which the formula applies, then application software 205 extracts the data from the particular node as per block 430. Process flow then continues to more nodes test block 425.

The "more nodes in range" test of decision block 425 determines whether or not the range specification includes more nodes that need evaluation for application of the formula of the particular node thereto. If there are more nodes in the range specification, then application 205 advances to a next node for evaluation by one of 1) traversing a soft link to the next node for evaluation, as per block 430; 2) traversing rootward to the next node for evaluation, as per block 435; and 3) traversing leafward to the next node for evaluation, as per block 440. To determine which of these actions to take during evaluation of a node, application software 205 accesses the range specification depicted in FIG. 1F. The range specification identifies the start node as START NODE DESCRIPTOR 150. Thus, application software 205 can readily determine if the node, currently under evaluation for inclusion in the range to which the formula applies, is the start node. If the node under evaluation is the start node, then software application 205 reads the INCLUDE START NODE descriptor 156 to determine whether or not to actually include the start node in the range to which the formula ultimately applies.

Software application 205 advances to the next node of the range specification by traversing a soft link from the prior node under evaluation or by traversing leafward or rootward according to what the range specification of FIG. 1F directs. The FOLLOW SOFT LINKS descriptor 160 of FIG. 1F is set to YES and thus the range specification of the particular node allows traversing a soft link to include the next node reached via soft link for inclusion in the range to which the formula applies. If software application 205 traverses a soft link to a next node as per block 432, then software application 205 includes that next node in the range if this next node passes the "use this node" test of test block 420. In response, application software extracts the data of this next node. If software application 205 traverses a link rootward as directed by DIRECTION descriptor 152 to reach a next node for evaluation for inclusion in the range, then if this next node passes the "use this node" test of test block 420, application software 205 extracts data from this next node, as per block 430. Likewise, if software application 205 traverses a link leafward as directed by DIRECTION descriptor 152 to reach a next node for evaluation for inclusion in the range, then if this next node passes the "use this node" test of test block 420, application software 205 extracts data from this next node, as per block 430.

After extracting data from the next node in block 430, software application 205 conducts the test of block 425 to determine if there are any more nodes in the range specification that software application 205 should evaluate for inclusion in the range to which the formula will apply. When there are no more nodes either rootward, leafward or via soft link for evaluation, software application 205 applies the formula of the particular node to the extracted data that the application accumulated from the selected nodes, namely to the data extracted from each of the nodes found to be in the range specification. In an alternative embodiment, application 205 may apply the formula to each included node of the range specification when the application traverses each node and extracts that node's data rather than waiting to apply the formula until after the application extracts the data from all of the included nodes that the range specification designates.

The range specification of FIG. 1F places other limitations on those nodes that the application should include in the range associated with a particular calculated node. Software application 205 may consider these limitations when determining if there are more nodes in that range at decision block 425. For example, decision block 425 employs the DEPTH descriptor 154 to determine if the software application already processed and extracted data from linked nodes up to a predetermined depth away from the start node for inclusion in the range of nodes. Linked nodes are those nodes extending from a particular start node in either a leafward or rootward direction. The range specification may also include an ITEM TO OPERATE ON descriptor 158 such as "numbers only" that instructs software application 205 to extract numerical data from a node. THE ITEM TO OPERATE ON descriptor 158 may also have a "text only" value that instructs software application 205 to extract text data from a node.

Once software application 205 considers all appropriate nodes for inclusion in the range that the range specification designates and accumulates extracted data from those nodes, software application 205 applies the formula of the particular calculated node to the data extracted from the nodes within the designated range, as per block 445. In response to software application 205 applying the formula of the calculated node to the accumulated extracted data, application 205 produces a result that IHS 200 renders and displays on display 240, as per block 450. Process flow then continues to block 415 at which the process ends. Alternatively, the process may restart at block 415 by advancing to another calculated node and starting the process anew at "formula in this node?" decision block 410.

Those skilled in the art will appreciate that the various structures disclosed can be implemented in hardware or software. Moreover, the methodology represented by the blocks of the flowcharts of FIG. 3 and FIG. 4 may be embodied in a computer program product, such as a media disk, media drive or other media storage such as computer program product medium 210 of FIG. 1.

In one embodiment, relationship map generator software 205 implements the disclosed methodology as a set of instructions (program code) in a code module that may, for example, reside in the system memory 220 of IHS 100 of FIG. 2. Until IHS 200 requires this set of instructions, another memory, for example, non-volatile storage 245 such as a hard disk drive, or a removable memory such as an optical disk or floppy disk, may store this set of instructions. IHS 200 may also download this set of instructions via the Internet or other computer network. Thus, a computer program product may implement the disclosed methodology for use in a computer such as IHS 200. In such a software embodiment, RAM or system memory 220 may store code that carries out the functions described in the flowcharts of FIG. 3 and FIG. 4 while processor 215 executes such code. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of generating a relationship map, comprising:
   inputting, to an information handling system (IHS), relationship data including a plurality of nodes that include node data and that together form the relationship map;
   inputting, to the IHS, a formula to be associated with a particular node of the plurality of nodes;
   inputting, to the IHS, range information for the formula associated with the particular node, the range information specifying a range of nodes to which the formula associated with the particular node should be applied, wherein the range information includes a follow soft links descriptor;
   extracting the node data from the nodes that the range information specifies;
   applying, by the IHS, the formula associated with the particular node to node data derived from the range of nodes to determine result information for the particular node, wherein the range information includes a rootward direction descriptor and the follow soft links descriptor; and
   displaying, by the IHS on a display, the relationship map including the particular node updated with the result information.

2. The method of claim 1, wherein the range information includes a ID start node descriptor.

3. The method of claim 1, wherein the range information includes a depth node descriptor.

4. The method of claim 1, wherein the range information includes an include start node descriptor.

5. A information handling system (IHS), comprising:
   a processor;
   a memory coupled to the processor, the memory being configured with a relationship map generator that:
   receives relationship data including a plurality of nodes that include node data and that together form a relationship map;
   receives a formula to be associated with a particular node of the plurality of nodes;
   receives range information for the formula associated with the particular node, the range information specifying a range of nodes to which the formula associated with the particular node should be applied, wherein the range information includes a follow soft links descriptor;
   extracts the node data from the nodes that the range information specifies;
   applies the formula associated with the particular node to node data derived from the range of nodes to determine result information for the particular node, wherein the range information includes a rootward direction descriptor and the follow soft links descriptor; and
   activates display of the particular node of the relationship map updated with the result information.

6. The IHS of claim 5, wherein the range information includes a ID start node descriptor.

7. The IHS of claim 5, wherein the range information includes a depth node descriptor.

8. The IHS of claim 5, wherein the range information includes an include start node descriptor.

9. A computer program product stored on a non-transitory computer operable medium, comprising:
   instructions that receive relationship data including a plurality of nodes that include node data and that together form a relationship map;
   instructions that receive a formula to be associated with a particular node of the plurality of nodes;
   instructions that receive range information for the formula associated with the particular node, the range information specifying a range of nodes to which the formula associated with the particular node should be applied, wherein the range information includes a follow soft links descriptor;
   instructions that extract the node data from the nodes that the range information specifies;
   instructions that apply the formula associated with the particular node to node data derived from the range of nodes to determine result information for the particular node, wherein the range information includes a rootward direction descriptor and the follow soft links descriptor; and instructions that activate display of the particular node of the relationship map updated with the result information.

10. The computer program product of claim 9, wherein the range information includes a ID start node descriptor.

11. The computer program product of claim 9, wherein the range information includes a depth node descriptor.

12. The computer program product of claim 9, wherein the range information includes an include start node descriptor.

* * * * *